(12) United States Patent
Kermoal et al.

(10) Patent No.: US 11,570,645 B2
(45) Date of Patent: Jan. 31, 2023

(54) FIRST ROADSIDE NETWORK UNIT AND METHOD FOR OPERATING THE FIRST ROADSIDE NETWORK UNIT

(71) Applicant: Robert Bosch GmbH, Stuttgart (DE)

(72) Inventors: Jean-Philippe Kermoal, Munich (DE); Frank Hofmann, Hildesheim (DE); Kurt Eckert, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/631,926

(22) PCT Filed: Jun. 11, 2018

(86) PCT No.: PCT/EP2018/065304
§ 371 (c)(1),
(2) Date: Jan. 17, 2020

(87) PCT Pub. No.: WO2019/015875
PCT Pub. Date: Jan. 24, 2019

(65) Prior Publication Data
US 2020/0162955 A1    May 21, 2020

(30) Foreign Application Priority Data

Jul. 18, 2017  (DE) .......................... 102017212246.3
Oct. 13, 2017  (DE) .......................... 102017218323.3

(51) Int. Cl.
*H04W 24/10* (2009.01)
*H04W 4/46* (2018.01)
(Continued)

(52) U.S. Cl.
CPC .......... *H04W 24/10* (2013.01); *G08G 1/0116* (2013.01); *H04W 4/46* (2018.02);
(Continued)

(58) Field of Classification Search
None
See application file for complete search history.

(56) References Cited

U.S. PATENT DOCUMENTS

2008/0200121 A1*  8/2008  Yamamoto ............. G08G 1/093
                                                            455/41.2
2017/0339588 A1*  11/2017  Moon .................... H04W 76/27
(Continued)

FOREIGN PATENT DOCUMENTS

DE    102012216827 B3    2/2014
DE    102014216795 A1    2/2016
(Continued)

OTHER PUBLICATIONS

International Search Report for PCT/EP2018/065304, dated Oct. 5, 2018.
(Continued)

*Primary Examiner* — Chi H Pham
*Assistant Examiner* — Raul Rivas
(74) *Attorney, Agent, or Firm* — Norton Rose Fulbright US LLP; Gerard Messina

(57) ABSTRACT

A first roadside network unit is provided. A first transceiver for a first wireless communication network is designed to receive data from a second wireless network unit on a first channel of the first wireless communication network. A processor is designed to provide the received data to a second transceiver for transmission to a third roadside network unit. The second transceiver for a second wireless communication network is designed to transmit the data provided by the processor to the third roadside network unit on a second channel of the second communication network.

16 Claims, 6 Drawing Sheets

(51) Int. Cl.
  *G08G 1/01*    (2006.01)
  *H04W 24/02*   (2009.01)
  *H04W 24/08*   (2009.01)
  *H04W 72/04*   (2009.01)
  *H04W 84/18*   (2009.01)

(52) U.S. Cl.
  CPC .......... *H04W 24/02* (2013.01); *H04W 24/08* (2013.01); *H04W 72/0413* (2013.01); *H04W 84/18* (2013.01)

(56) References Cited

U.S. PATENT DOCUMENTS

| | | | | |
|---|---|---|---|---|
| 2018/0184269 A1* | 6/2018 | Christoval | .............. | H04W 4/38 |
| 2019/0059071 A1* | 2/2019 | Khoryaev | .............. | H04W 4/027 |
| 2019/0313375 A1* | 10/2019 | Loehr | .................. | H04W 72/04 |

FOREIGN PATENT DOCUMENTS

| | | |
|---|---|---|
| WO | 2014048486 A1 | 4/2014 |
| WO | 2016159712 A1 | 10/2016 |
| WO | 2017052488 A1 | 3/2017 |

OTHER PUBLICATIONS

Ferrari G, et al., "Cross-Network Information Dissemination in Vanets", Its Telecommunications (ITST), 2011 11th International Conference On, IEEE, 2011, pp. 351-356, XP032064679.
ETSI EN 302 637-3 V1.2.1 (Sep. 2014), 73 pages.
ETSI EN 302 637-2 V1.3.1 (Sep. 2014), 44 pages.
3GPP TS 36.300 V14.2.0 (Mar. 2017), 330 pages.
"802.11P-2010—IEEE Standard for Information Technology—Local and Metropolitan Area Networks—Specific Requirements—Part 11: Wireless LAN Medium Access Control (MAC) and Physical Layer (PHY) Specifications, Amendment 6: Wireless Access in Vehicular Environments", 51 pages.
ETSI EN 302 663 V1.2.0 (Nov. 2012), 24 pages.
ETSI TS 102 687 V1.1.1 (Jul. 2011), 45 pages.
Michailidis, et al.: "Relay Selection in V2V Communications Based on 3-D Geometrical Channel Modeling", 2016 10th European Conference on Antennas and Propagation (EUCAP), European Association of Antennas and Propagation, Apr. 10, 2016, pp. 1-5, XP032906948.
Intelligent Transport Systems (ITS), Vehicular Communications; GeoNetworking; Part 3: Network Architecture, ETSI EN 302 636-3 V1.2.1, (2014), pp. 1-23.
Discussion on V2I Deployment Scenario, 3GPP TSG RAN WG1 Meeting #83, Anaheim, USA. (2015), CMCC, R1-157440, pp. 1-4.

* cited by examiner

FIRST ROADSIDE NETWORK UNIT AND METHOD FOR OPERATING THE FIRST ROADSIDE NETWORK UNIT

FIELD

The present invention relates to a first roadside network unit and a method for operating the first roadside network unit.

BACKGROUND INFORMATION

Vehicles today are already able to exchange information with other vehicles in their vicinity (V2V: vehicle to vehicle). Vehicles may also communicate wirelessly with roadside infrastructure (V2I: vehicle to infrastructure). Likewise, the vehicle may communicate wirelessly with a back end server on the Internet (V2N: vehicle to network) or with a pedestrian terminal (V2P: vehicle to person). This communication is also referred to overall as vehicle to everything (V2X).

The development of new functions and services in the automotive industry, such as automated driving, benefits from V2X. Traffic safety, driving comfort and energy efficiency may be improved. This results in new products and business models for automotive manufacturers, automotive suppliers and other service providers.

The first generation of V2X applications, to be used in the years ahead, is based primarily on use on the road. Their purpose is to provide the driver with information about the road surroundings. Vehicles periodically provide status information (e.g., position, speed, acceleration, etc.) and/or event information (rescue operations, a broken-down vehicle, traffic jams). This information is generally transmitted locally in the form of text messages.

This event-based piece of information may be sent to a central network unit (base station, backend) by neighboring vehicles.

There are presently two competing technologies for V2X direct device-to-device (D2D) communication. The first technology is based on the radio-based IEEE 802.11p standard, which forms the basis for the comprehensive DSRC standard (Dedicated Short Range Communication) in the United States and the ETSI ITS G5 standard (ETSI: European Telecommunications Standards Institute; ITS: Intelligent Transport Systems) in Europe. The second technology is based on 3GPP (3rd Generation Partnership Project) LTE (Long Term Evolution) and is also known by the abbreviation LTE-V2X. An enhancement of the LTE-V2X technology is expected with 5G (5th generation mobile networks).

The IEEE 802.11p standard uses the PHY layer of the IEEE 802.11a standard, based on orthogonal frequency division multiplexing (OFDM) with a number of modifications. The MAC layer is based on enhanced distributed channel access (EDCA), which is competition-based. Carrier sense multiple access (CSMA) with collision avoidance (CSMA/CA) is also used. CSMA/CA follows the listen-before-talk principle for minimizing collisions on the channel. When a network unit (a vehicle in this context) has data to transmit, it carries out a channel measurement to check whether the channel is occupied. If the channel is detected to be empty, the network unit delays the planned transmission for a randomly ascertained time and then begins the transmission. If the channel is occupied during the channel measurement, the network unit will carry out a backoff procedure, i.e., it awaits the next channel access for a randomly ascertained period of time. The greater the number of network units attempting to transmit within a geographic area, the greater the probability that a network unit delays its transmission, which results in overall longer delays in the network. The IEEE 802.11p standard offers advantages over other WLAN standards based on IEEE 802.11 with regard to latency and signaling complexity and is adapted to the V2V application scenario.

The LTE extension for V2X in 3GPP Release 14 and higher provides to use a licensed and/or an unlicensed spectrum for the communication. The V2V communication is based on a direct device-to-device interface (also referred to as a sidelink interface on the physical layer). In contrast to 802.11p, the transmission takes place with cell support, i.e., it is carried out by the network in a planned manner. Transmission rights are granted by a scheduler unit situated in the base station, thus avoiding collisions and minimizing interferences. The control by the base station may be carried out only in areas in which the base station signal is available (in coverage). In a case in which no base station signal is available (out of coverage), the communication takes place via the sidelink, using predefined parameters.

During the course of developing communication standards—for example, based on different applications or development activities from different technological fields—various standards may be proposed for the same frequency range. As a result, different wireless communication systems would transmit in the same frequency range, resulting in performance impairments for both technologies.

Consequently, an objective technical object could be formulated in such a way that a coexistence mechanism for the two different wireless communication technologies is created to equitably distribute existing resources on a shared frequency range.

SUMMARY

An object of the present invention may be achieved by an example first roadside network unit and an example method for operating the first roadside network unit.

According to a first aspect of the present invention, it is provided that a first transceiver of the example first network unit for a first wireless communication network is designed to receive data from a second roadside network unit on a first channel of the first wireless communication network. A processor is designed to provide the received data to a second transceiver for a transmission to a third roadside network unit. The second transceiver for a second wireless communication network is designed to transmit the data provided by the processor to the third roadside network unit on a second channel of the second communication network.

According to a second aspect of the present invention, the provided example method includes the following steps: Receiving data from a second roadside network unit on a first channel of a first wireless communication network; providing the received data for a transmission to a third roadside network unit; and transmitting the provided data to a third roadside network unit on a second channel of a second communication network.

Due to the provided first network unit and the provided method, the advantages mentioned below are achieved: Messages may be implemented and transmitted from the first wireless communication network to the second wireless communication network. In a start phase of the coexistence of the two technologies, i.e., the two wireless communication networks, the traffic safety and traffic efficiency are improved, since messages relating to the traffic safety or the traffic efficiency are available in both wireless networks, and a higher penetration of the messages is thus achieved.

Additional features and advantages of the present invention are described below in the context of exemplary embodiments.

DETAILED DESCRIPTION OF EXAMPLE EMBODIMENTS

Figure 1:
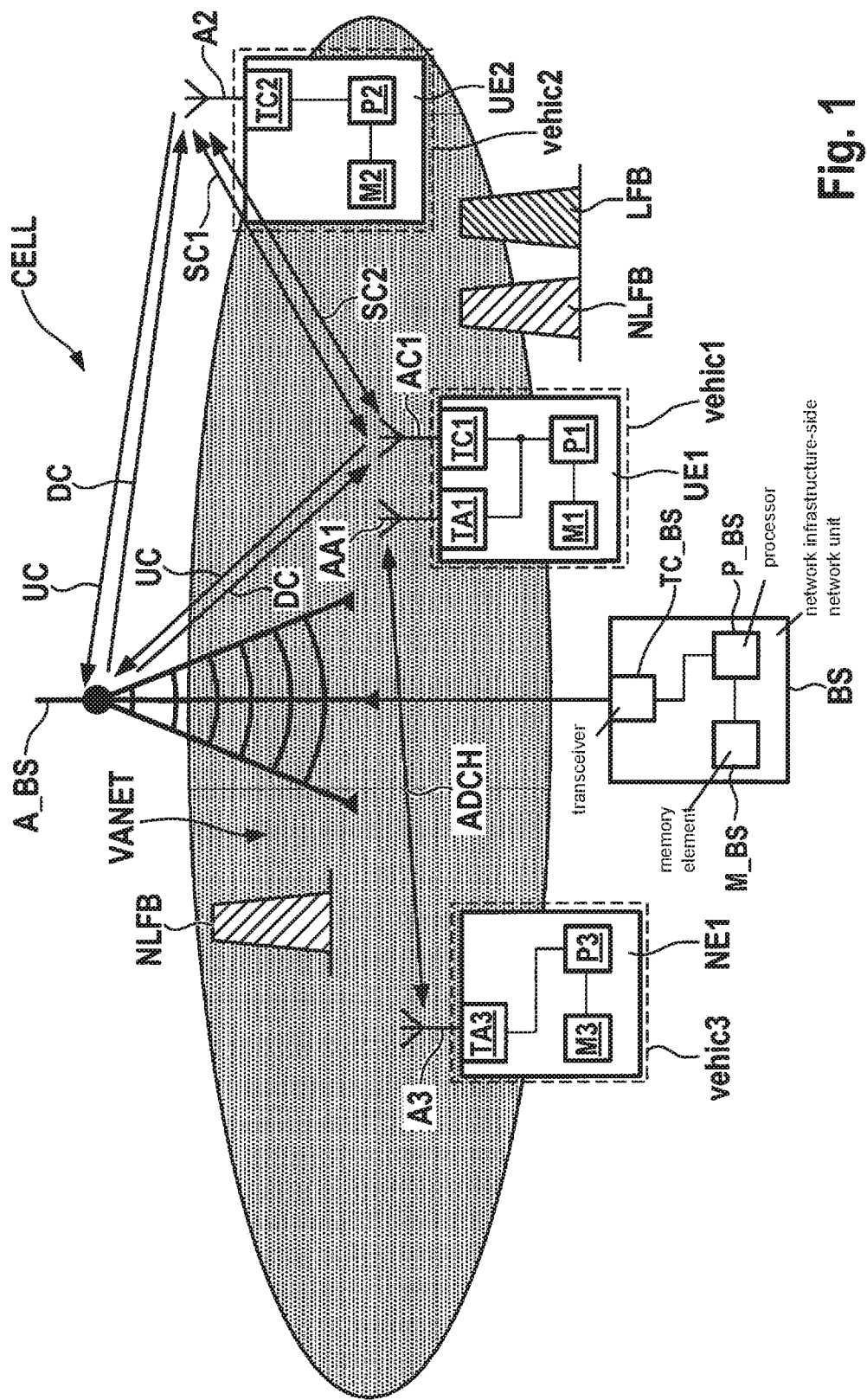
FIG. 1 shows a first cell-based wireless communication network and a second wireless communication network in accordance with the present invention.

FIG. 1 shows a cell-based wireless communication network CELL and an ad hoc wireless communication network VANET. Cell-based wireless communication network CELL includes a network infrastructure-side network unit BS, a roadside network unit UE1 and a roadside network unit UE2. Network infrastructure-side network unit BS includes a processor P_BS, a memory element M_BS and a transceiver TC_BS. Network infrastructure-side network unit BS may also be referred to as a base station or eNodeB. Network infrastructure-side network unit BS is connected to a stationary antenna A_BS for the purpose of transmitting data on a downlink channel DC and receiving data on an uplink channel UC. Antenna A_BS includes, for example, a number of antennas and is designed, for example, as a remote radio head (RRH). Network infrastructure-side network unit BS and antenna A_BS provide a cell C, within which roadside network units UE1 and UE2 communicate with network unit BS. Of course, network infrastructure-side network unit BS may have a distributed design within the scope of a virtualization and be made up of separate network units. Network units BS, UE1 and UE2 are configured, for example, according to the LTE-V2X standard.

Roadside network unit UE1 includes a processor P1, a memory element M1, a transceiver TA1 and a transceiver TC1. Transceiver TA1 is connected to an antenna AA1. Transceiver TC1 is connected to an antenna AC1. In one specific embodiment, antennas AA1 and AC1 are designed in the form of a shared antenna unit, which is not illustrated. Roadside network unit UE2 includes a processor T2, a memory element M2, a transceiver TC2 and an antenna A2.

The two roadside network units UE1, UE2 are situated within cell C and are able to receive data on downlink channel DC and transmit data on uplink channel UC. The two roadside network units UE1, UE2 are able to communicate directly with each other via a sidelink channel SC1 in an unlicensed frequency range NLFB and via a sidelink channel SC2 in a licensed frequency range LFB. Of course, network units UE1, UE2 are also able to communicate outside cell C via sidelink channels SC1, SC2.

In this description, reference is made to single uplink channel UC and single downlink channel DC. For example, uplink channel UC and downlink channel DC include particular subchannels, i.e., multiple channels are available in the uplink and in the downlink. The same applies to sidelink channels SC1, SC2.

Wireless communication network VANET includes roadside network unit UE1 and a network unit NE1. Network unit NE1 includes a processor P3, a memory element M3, a transceiver TA3 and an antenna A3. Transceivers TA1 and TA3 are configured, for example, according to the IEEE 802.11p standard. Network units UE1 and NE1 communicate directly with each other via an ad hoc channel ADCH in unlicensed frequency range NLFB. Ad hoc channel ADCH is arbitrated by transceivers TA1, TA3 via a CSMA/CA protocol (CSMA/CA: Carrier Sense Multiple Access/Collision Avoidance).

Network units NE1 and UE1 are situated proximate to network unit UE2. Due to this proximity, the particular transmission power may be sufficient, so that transmissions on channels ADCH and SC1, which are transmitted in the same unlicensed frequency range NLFB, do not disadvantageously influence each other. The goal of this description is to reduce this mutual disadvantageous influence and to increase the penetration, i.e., to permit a larger number of roadside network units to receive warning and status messages.

Roadside network units UE1, UE2 and NE1 are situated in particular motor vehicles vehic1, vehic2, vehic3 and connected to a control unit situated therein, but not illustrated, for data exchange purposes. Alternatively, roadside network units UE1, UE2 and NE1 are part of the control unit in particular motor vehicle vehic1, vehic2, vehic3. In another alternative specific embodiment, roadside network units UE1, UE2 and NE1 are situated in a stationary infrastructure, for example a traffic light, instead of in a motor vehicle.

Sidelink channels SC1, SC2 and a sidelink in general are defined, for example, by the document 3GPP TS 36.300 V14.2.0 (2017-03), which is incorporated herein by reference in its entirety into the present description. The sidelink includes sidelink discovery, sidelink communication and V2X sidelink communication between network units UE1, UE2. The sidelink uses uplink resources and a physical channel structure similar to that of the uplink. The sidelink thus differs from the uplink with regard to the physical channel.

The sidelink is limited to individual cluster transmissions for the physical sidelink channels. The sidelink also uses a 1-symbol gap at the end of each sidelink subframe. A physical sidelink control channel (PSCCH) and a physical sidelink shared channel (PSSCH) are transmitted in the same subframe for the V2X sidelink communication. Sidelink channels SC1, SC2 are, for example, the PSSCH.

The physical layer processing of transport channels in the sidelink differs from the uplink transmission in the following steps: Scrambling: The scrambling is not specific to the network unit for a physical sidelink discovery channel (PSDCH) and PSCCH; modulation: 64 QAM and 256 QAM are not supported for the sidelink (QAM: quadrature amplitude modulation). The PSCCH specifies sidelink resources and other transmission parameters, which are used by particular network unit UE1, UE2 for the PSSCH.

For the PSDCH, PSCCH and PSSCH demodulation, reference signals similar to the uplink demodulation reference signals are transmitted in the 4th symbol of the slot in the normal CP, cyclic prefix, and in the third symbol of the slot in the expanded CP. The sidelink demodulation reference signal sequence length corresponds to the size (number of subcarriers) of the assigned resource. For the V2X sidelink communication according to channels SC1, SC2, reference signals are transmitted in the 3rd and 6th symbols of the first slot and in the 2nd and 5th symbols of the second slot in the CP. Reference signals based on a fixed base sequence, cyclical shift and orthogonal cover code are generated for PSDCH and PSCCH. For the V2X sidelink communication, the cyclical shift for PSCCH is randomly selected for each transmission.

For measurements of particular sidelink channel SC1, SC2, the following options are available on the part of network units UE1, UE2: reception power output of the sidelink reference signal (S-RSRP); reception power output of the sidelink discovery reference signal (SD-RSRP); reception power output of the PSSCH reference signal (PSSCH-RSRP); signal strength indicator for sidelink reference signals (S-RSSI).

Ad hoc channel ADCH and ad hoc wireless communication network VANET are defined, for example by the IEEE standard "802.11p-2010—IEEE Standard for information technology—Local and metropolitan area networks—Specific requirements—Part 11: Wireless LAN medium access control (MAC) and physical layer (PHY) specifications, Amendment 6: Wireless access in vehicular environments," which is incorporated herein by reference in its entirety into the present description. IEEE 802.11p is a standard for enhancement of the WLAN standard IEEE 802.11. The objective of IEEE 802.11p is to establish the WLAN technology in passenger motor vehicles and to create a reliable interface for applications for intelligent transport systems (ITS). IEEE 802.11p is also the basis for dedicated short-range communication (DSRC) in the 5.85 GHz to 5.925 GHz frequency band. To avoid confusion with the European DSRC version, the term ITS-G5 is rather used instead of DSRC, primarily in Europe. The document "ETSI EN 302 663 V1.2.0 (2012-11)," which is incorporated herein by reference in its entirety into the present description, describes the two lowermost layers of the ITS-G5 technology (ITS G5: Intelligent transport systems operating in the 5 GHz frequency band), the physical layer and the data link layer. Transceivers TA1 and TA3 implement, for example, these two lowermost layers and corresponding functions according to "ETSI TS 102 687 V1.1.1 (2011-07)," for the purpose of using ad hoc channel ADCH. The following unlicensed frequency ranges, which are part of unlicensed frequency range NLFB, are available for using ad hoc channel ADCH in Europe: 1) ITS-G5A for safety-relevant applications in the frequency range of 5.875 GHz to 5.905 GHz; 2) ITS-G5B for non-safety-relevant applications in the frequency range of 5.855 GHz to 5.875 GHz; and 3) ITS-G5D for operating ITS applications in the frequency range of 5.905 GHz to 5.925 GHz. ITS-G5 permits a communication between the two network units UE1 and UE2 outside the context of a base station. ITS-G5 permits the immediate exchange of data frames and avoids a management overhead, which is used in setting up a network.

The document "ETSI TS 102 687 V1.1.1 (2011-07)," which is incorporated herein by reference in its entirety into the present description, describes a "decentralized congestion control mechanism" for ITS-G5. Ad hoc channel ADCH is used, among other things, for exchanging data relating to traffic safety and traffic efficiency. Transceivers TA1 and TA3 implement, for example, the functions described in the document "ETSI TS 102 687 V1.1.1 (2011-07)." The applications and services in ITS-G5 are based on the cooperative behavior of the roadside network units, which form ad hoc network VANET (VANET: vehicular ad hoc network). Ad hoc network VANET permits time-critical road traffic applications, in which a rapid exchange of information is necessary to warn and assist the driver and/or the vehicle in a timely manner. To ensure proper functioning of ad hoc network VANET, decentralized congestion control mechanisms (DCC) are used for ad hoc channel ADCH of ITS-G5. DCC has functions that are situated on multiple layers of the ITS architecture. The DCC mechanisms are based on knowledge of the channel. The channel status information is obtained by channel sounding. Alternatively or additionally, channel status information is obtained by monitoring the activity of the TPC (transmit power control), TRC (transmit rate control) and TDC (transmit data rate control) methods. The methods ascertain the channel status information as a function of receive signal level thresholds or preamble information of detected packets.

Figure 2:
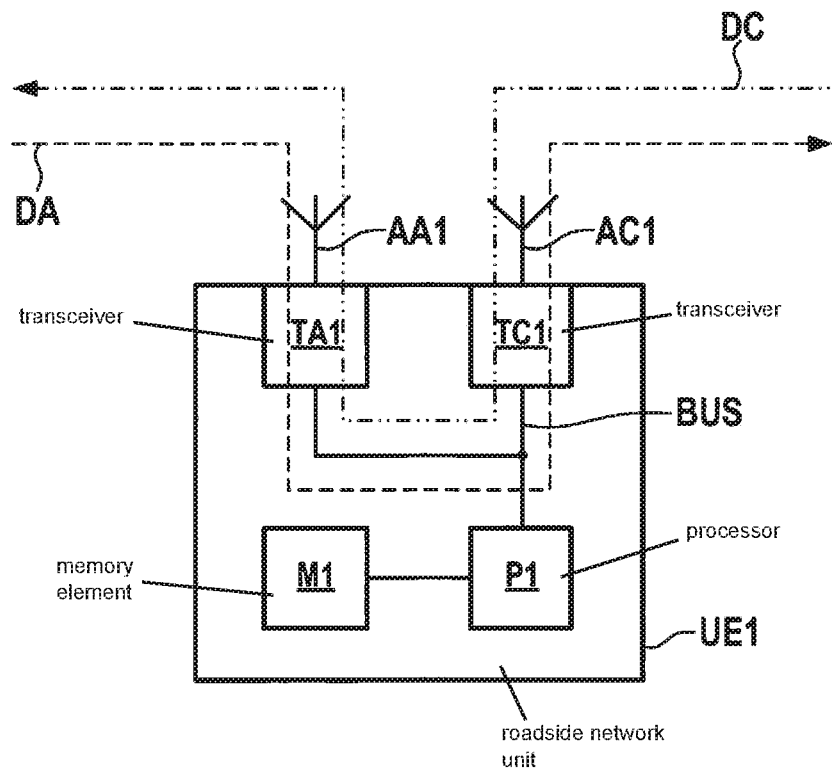
FIG. 2 shows a schematic block diagram in accordance with the present invention.

FIG. 2 shows roadside network unit UE1 in a schematic block diagram. Transceivers TA1 and TC1 as well as processor P1 are connected via a shared data bus BUS. Memory element M1 is connected directly to processor P1 but may, of course, also be connected via shared data bus BUS. The methods explained in this description are stored as a computer program in the memory element. When the computer program stored in memory element M1 is executed on processor P1, the described methods are implemented. Alternatively, the described methods are permanently programmed in processor P1, processor P1 being, for example, in an ASIC (application-specific integrated circuit).

Data DA are received via antenna AA1 and transceiver TA1. Processor P1 provides received data DA to transceiver TC1 for transmission. Transceiver TC1 and antenna AC1 transmit provided data DA. Data DC are received via antenna AC1 and transceiver TC1. Processor P1 provides received data DC to transceiver TA1 for transmission. Transceiver TA1 and antenna AA1 transmit provided data DC In one specific embodiment, data DA, DC received via one of transceivers TA1, TC1 are provided for transmission via particular other transceiver TC1, TA1 only if it is ascertained that received data DA, DC relate to a traffic safety or a traffic efficiency. The traffic safety or traffic efficiency is ascertained, for example, based on a message type. Message types DENM and CAM, for example, relate to the traffic efficiency and/or the traffic safety.

Messages of the CAM type (CAM: cooperative awareness message) are defined in the document "ETSI EN 302 637-2 V1.3.1 (2014-09), which is incorporated herein by reference in its entirety into the present description. In road traffic, cooperative awareness means that the road users and the roadside infrastructure notify each other of their own position, vehicle dynamics and properties. Road users are all types of road vehicles, such as cars, trucks, motorcycles, bicycles and pedestrians, and roadside infrastructure, including road signs, traffic lights or barriers and gates. CAM messages are transmitted at regular time intervals, i.e., periodically. A CAM-type message which indicates an emergency vehicle or a traffic jam is used not only for traffic efficiency but also for traffic safety.

DENM-type messages (DENM: decentralized environmental notification message) are defined in the document "ETSI EN 302 637-3 V1.2.1 (2014-09)," which is incorporated herein by reference in its entirety into the present description. A DEN service (DEN: decentralized environmental notification) supports an RHW application (RHW: road hazard warning). The DEN service generates, manages and processes the DENM-type messages. A DENM-type message contains information about a road hazard or an abnormal traffic situation and the particular position. The DEN service supplies the DENM as the payload to the ITS network and transport layer for message distribution. An ITS application distributes a DENM-type message to the network units by direct vehicle-to-vehicle or vehicle-to-infrastructure communication on ad hoc channel ADCH. On the receiving side, the DEN service of a received ITS-S processes the received DENM-type message and supplies the DENM content to an application. This application transmits information to the driver or the vehicle if the information about the road traffic condition is relevant to the driver. The driver or the vehicle is then able to take corresponding measures to respond accordingly to the situation.

Figure 3:
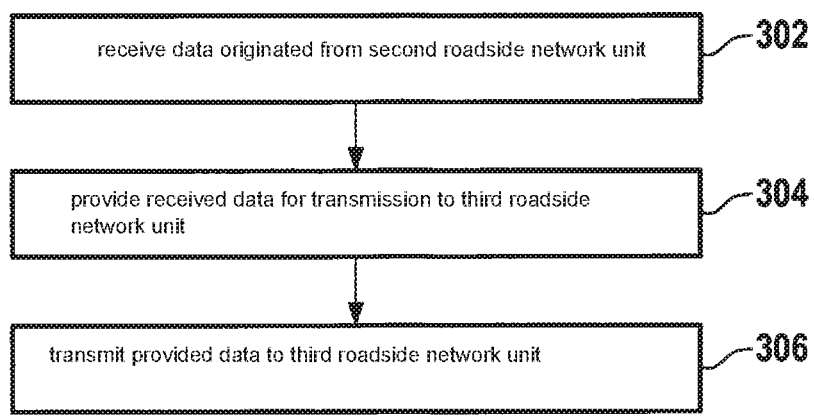
FIG. 3 shows a schematic flowchart in accordance with the present invention.

FIG. 3 shows a schematic flowchart. According to a step 302, data are received, which originate from a second roadside network unit and are transmitted by the second roadside network unit on a first channel of a first wireless communication network. According to a step 304, the received data are provided for a transmission to a third roadside network unit. According to a step 306, the provided data are transmitted to the third network unit on a second channel of a second communication network.

Figure 4:
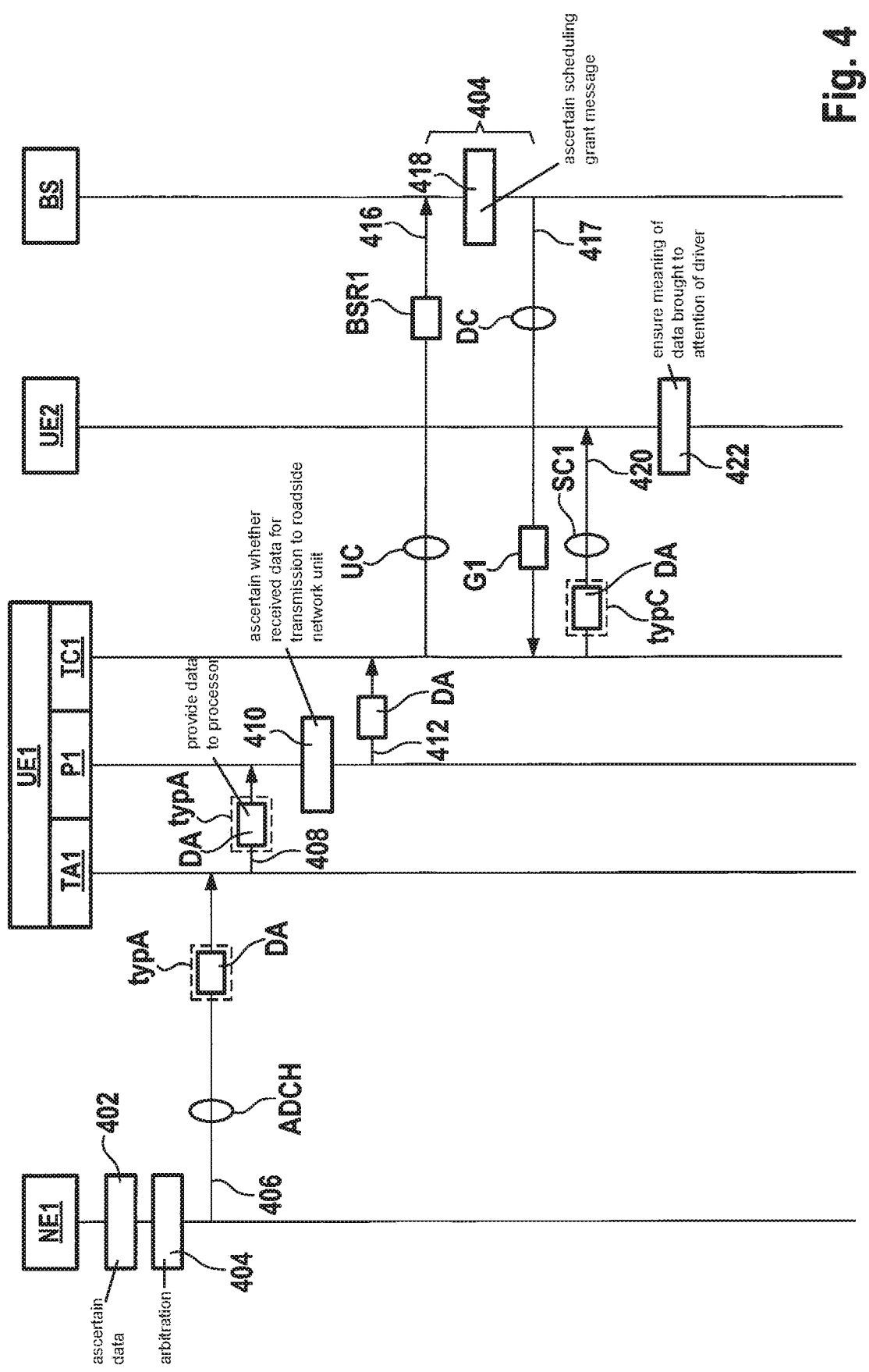
FIGS. 4 through 7 each show a schematic sequence diagram in accordance with the present invention.

FIG. 4 shows a schematic flowchart. Network unit NE1 ascertains data DA in a step 402. In a step 404, an arbitration takes place according to the CSMA/CA access method for accessing ad hoc channel ADCH. In a step 406, data DA are transmitted in a typA-type message on ad hoc channel ADCH and are received with the aid of transceiver TA1. In a step 408, transceiver TA1 provides data DA to processor P1. In a step 410, processor P1 ascertains whether received data DA are provided to transceiver TC1 for a transmission to roadside network unit UE2. This decision is made, for example as a function of message type typA. Message type typA indicates, for example, whether the distribution of data DA has a positive benefit with regard to traffic safety or with regard to traffic efficiency.

If it is now determined in step 410 that a relevance of data DA exists with regard to traffic safety or with regard to traffic efficiency, processor P1 provides data DA to transceiver TC1 for transmission in a step 412. In a step 414, an arbitration of sidelink channel SC1 is started. For this purpose, transceiver TC1 transmits a scheduling request message BSR1, for example a buffer status report, to network infrastructure-side network unit BS on uplink channel UC in a step 416 which, in one specific embodiment which is not illustrated, takes place before step 412. In a step 418, network unit BS ascertains a scheduling grant message G1 as a function of scheduling request message BSR1 and transmits it in a step 417 to network unit UE1 on downlink channel DC. Scheduling grant message G1 includes sidelink resources, i.e., a time/frequency location, such as a physical resource block (PRB) and/or a modulation and coding scheme (MCS) of sidelink channel SC1, which are reserved for the transmission of data DA by network unit UE1. In a step 420, data DA are transmitted to network unit UE2 on the assigned sidelink resource of sidelink channel SC1 with the aid of a message type typC. Message type typC preferably indicates that the distribution of data DA has a positive benefit with regard to traffic safety or with regard to traffic efficiency and is therefore treated as a priority by network unit UE2. In a step 422, network unit UE2 ensures, for example, that the particular meaning of received data DA, such as a broken-down vehicle, an accident, an approaching emergency vehicle, is brought to the attention of the vehicle driver. The driver may be alerted, for example, with the aid of a corresponding signaling in the cockpit of the vehicle.

Step 414 is not carried out in the out-of-coverage case, i.e., in the case in which sidelink channel SC1 is not scheduled. Network unit UE1 then arbitrates sidelink channel SC1 independently.

Network unit UE1 advantageously ensures that data DA originating from wireless communication network VANET is implemented in cell-based wireless communication network CELL. As a result, the use of network unit UE1 ensures that the availability of the data relating to traffic efficiency and traffic safety enters both wireless communication networks VANET and CELL. Network units UE2 and NE1, which support only one of the two network technologies, benefit therefrom.

Figure 5:
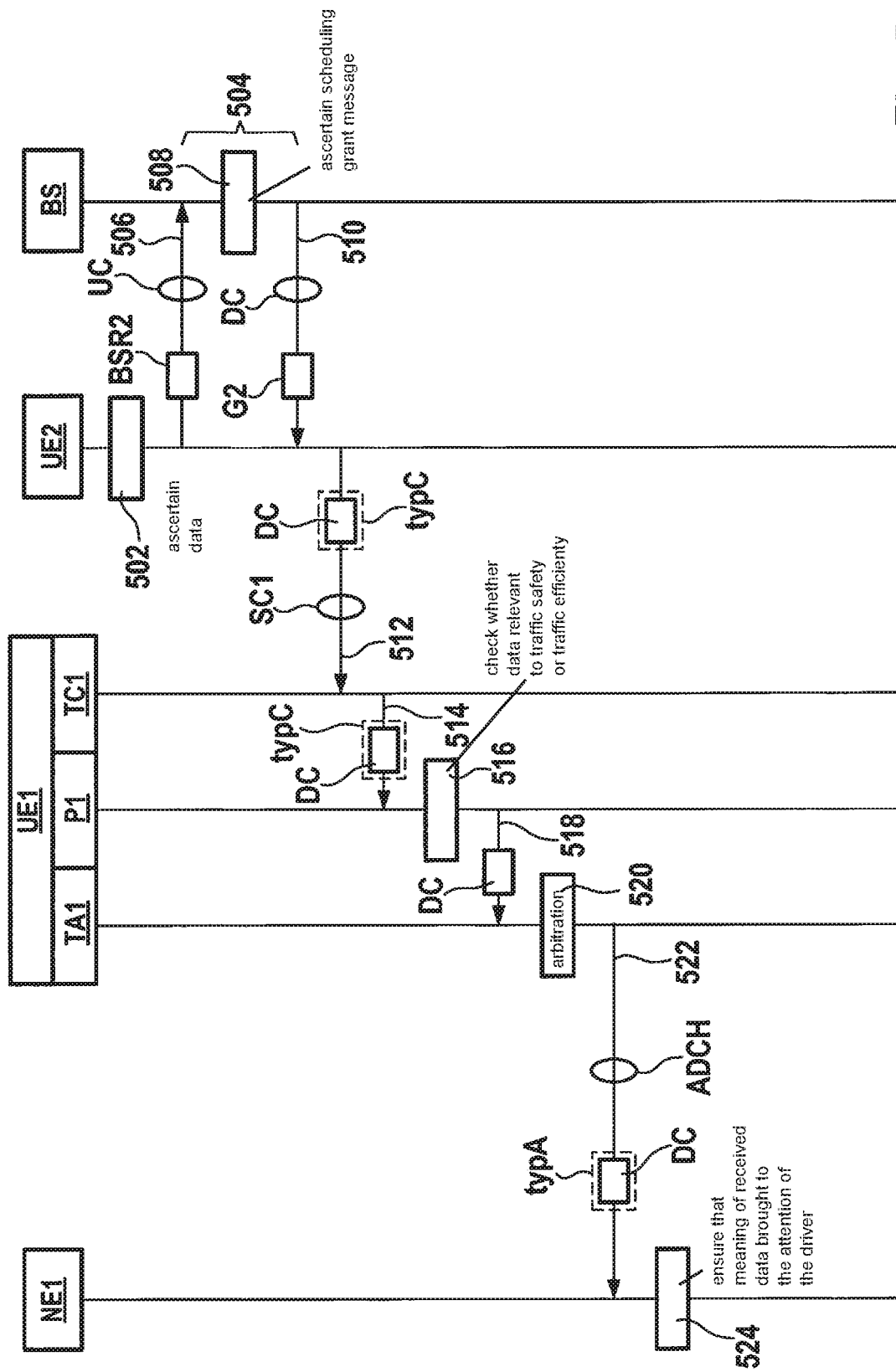

FIG. 5 shows a schematic flowchart. In a step 502, network unit UE2 ascertains data DC. In a step 504, an arbitration of sidelink channel SC1 is started. For this purpose, in a step 506, network unit UE2 transmits a scheduling request message BSR2, for example a buffer status report, to network infrastructure-side network unit BS on uplink channel UC. In a step 508, network unit BS ascertains a scheduling grant message G2 as a function of scheduling request message BSR2 and transmits scheduling grant message G2 in a step 510 to network unit UE2 via downlink channel DC. Scheduling grant message G2 includes sidelink resources, i.e., a time/frequency location, such as a physical resource block (PRB) and/or a modulation and coding scheme (MCS) of sidelink channel SC1, which are reserved for the transmission of data DC by network unit UE2. In a step 512, data DC are transmitted to network unit UE1 on the assigned sidelink resource of sidelink channel SC1 with the aid of message type typC and are received by transceiver TC1 of network unit UE1. In a step 514, transceiver TC1 provides data DC to processor P1. In a step 516, processor P1 checks whether data DC are relevant for traffic safety or traffic efficiency. If this is the case, processor P1 provides data DC to transceiver TA1 in a step 518 for the purpose of transmitting, i.e., implementing, data DC to/in wireless communication network VANET. In step 520, transceiver TA1 starts an arbitration of ad hoc channel ADCH. In a step 522, data DC are transmitted to network unit NE1 on ad hoc channel ADCH. For example, message type typA is used for this purpose. In step 522, data DC are transmitted to all neighboring network units of ad hoc wireless communication network VANET, i.e., a broadcast operation for data DC takes place. Message type(s) typA and/or typC include(s), for example, types CAM and DENM.

In a step 524, network unit NE1 ensures, for example, that the particular meaning of received data DC, such as a broken-down vehicle, an accident, an approaching emergency vehicle, is brought to the attention of the vehicle driver of the associated motor vehicle. The driver may be alerted, for example, with the aid of a corresponding signaling in the cockpit of the vehicle.

Figure 6:
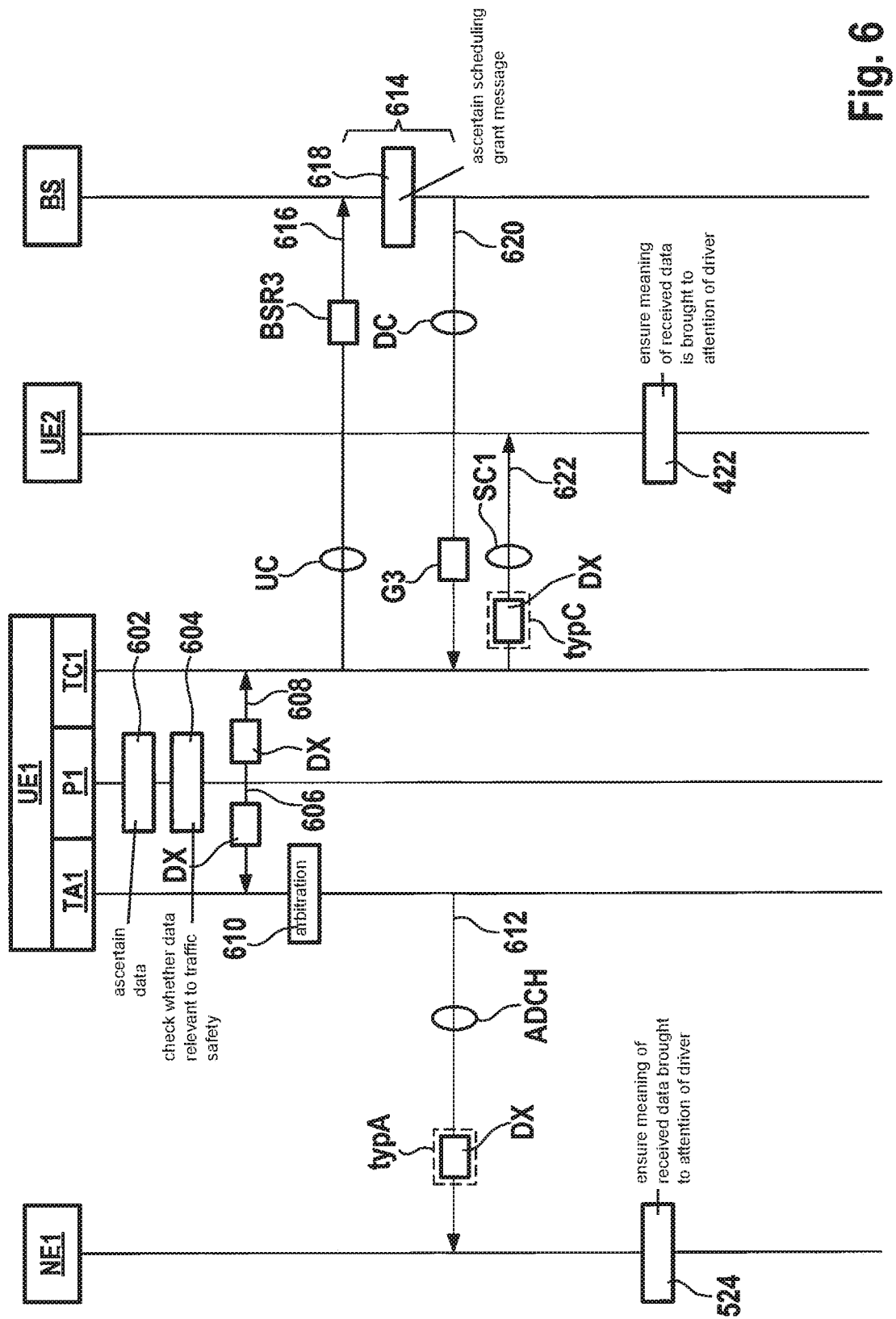

FIG. 6 shows a schematic flowchart. Data DX are ascertained in step 602. This independent ascertainment of data DX includes, for example, the ascertainment of an end of a traffic jam or the ascertainment that the motor vehicle associated with network unit UE1 has broken down, due to a defect. In step 604, a check of whether data DX are relevant for traffic safety is carried out. If this is the case, data DX are provided to particular transceivers TA1 and TC1 for particular transmission in steps 606 and 608. In a step 610, transceiver TA1 starts an arbitration of ad hoc channel ADCH and in a step 612 transmits data DX according to message type typA in the broadcast operation. In step 612, data DX are transmitted to all neighboring network units of ad hoc wireless communication network VANET, i.e., a broadcast operation for data DX takes place. With regard to step 524, reference is made to the discussion of FIG. 5.

In a step 614, an arbitration of sidelink channel SC1 is carried out. For this purpose, in a step 616, transceiver TC1 transmits a scheduling request message BSR3, for example a buffer status report, to network infrastructure-side network unit BS on uplink channel UC. In a step 618, network unit BS ascertains a scheduling grant message G3 as a function of scheduling request message BSR3 and transmits it in a step 620 to network unit UE1 on downlink channel DC. Scheduling grant message G3 includes sidelink resources, i.e., a time/frequency location, such as a physical resource block (PRB) and/or a modulation and coding scheme (MCS) of sidelink channel SC1, which is reserved for the transmission of data DA by network unit UE1. In a step 622, data DX are transmitted to network unit UE2 on the assigned sidelink resource of sidelink channel SC1 with the aid of a message type typC. With regard to step 422, reference is made to the discussion of FIG. 4.

Figure 7:
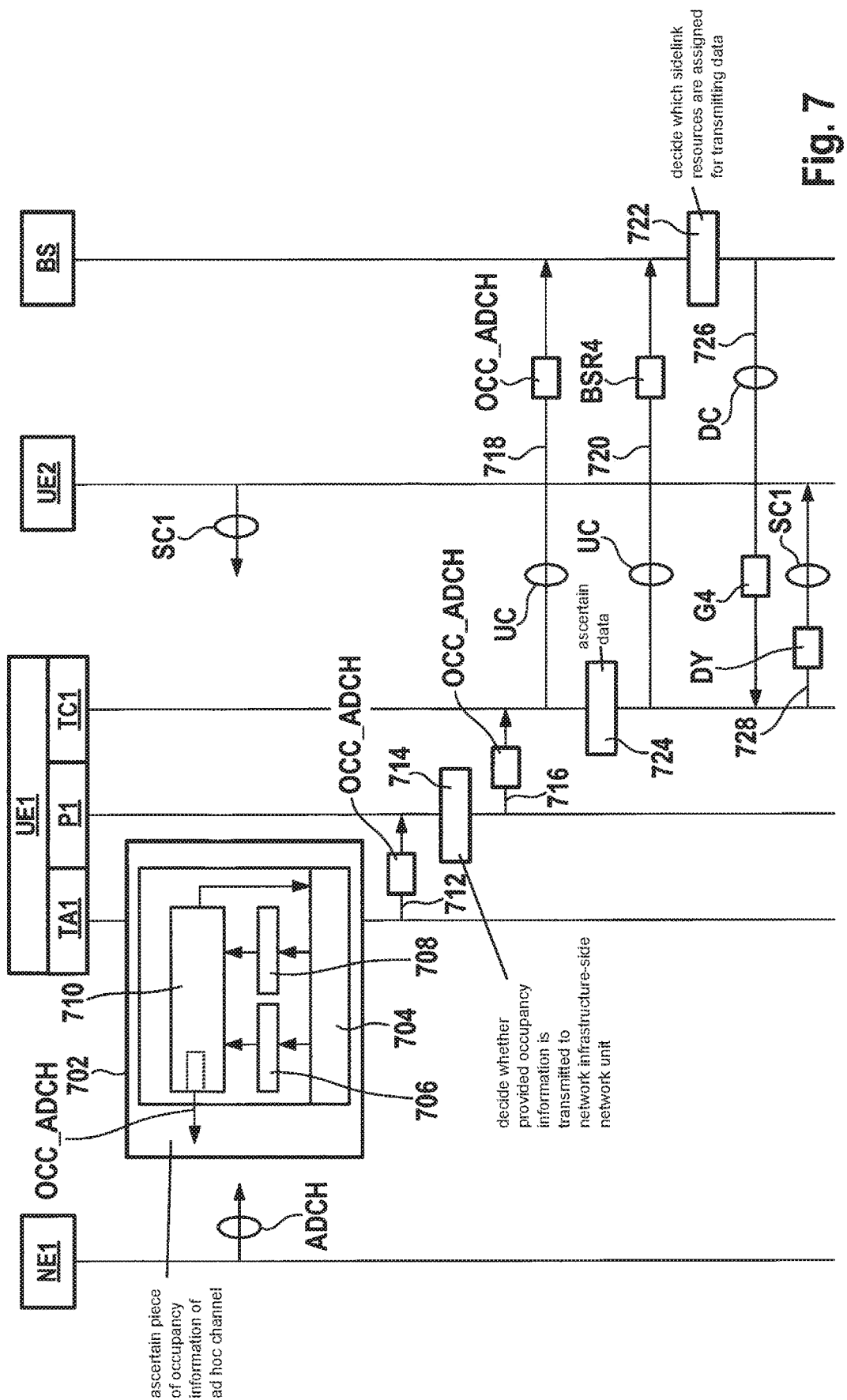

FIG. 7 shows a schematic flowchart. A piece of occupancy information OCC_ADCH of ad hoc channel ADCH is ascertained in a step 702. The occupancy information may also be referred to as channel status information. A block 704 associated with the data link layer and/or the physical layer carries out the arbitration of ad hoc channel ADCH. Ad hoc channel ADCH is used by additional network units. In addition, data traffic on sidelink channel SC1, which shares the unlicensed frequency band with ad hoc channel ADCH, may result in a reduced availability of ad hoc channel ADCH. A block 706 carries out a check of ad hoc channel ADCH, which includes, for example, the measurement of a reception power or an ascertainment of an occupancy status. A block 708 ascertains statistics about the transmitted data. The aforementioned measurement and the aforementioned statistics are ascertained together or separately by block 710 as occupancy information OCC_ADCH. Block 710 is furthermore designed to control block 704 and may, for example, change parameters of block 704 to increase the probability of transmission.

Occupancy information OCC_ADCH is provided to processor P1 in a step 712. In a step 714, it is decided whether provided occupancy information OCC_ADCH is transmitted to network infrastructure-side network unit BS. For example, the transmission of occupancy information OCC_ADCH may take place cyclically. In another example, occupancy information OCC_ADCH is transmitted to network unit BS only if occupancy information OCC_ADCH exceeds a threshold value, i.e., if occupancy information OCC_ADCH indicates an elevated occupancy of ad hoc channel ADCH. In a step 716, occupancy information OCC_ADCH is provided to transceiver TC1 for transmission to network unit BS. In a step 718, transceiver TC1 transmits occupancy information OCC_ADCH via uplink channel UC. In the present case, no arbitration operation is shown, since an uplink resource on uplink channel EC is provided for transmitting occupancy information OCC_ADCH, which is reserved by network unit BS without arbitration, for example in an uplink control channel. Alternatively, an arbitration of uplink channel UC, which is not illustrated, is carried out beforehand.

If network unit BS receives a scheduling request message BSR4 in a step 720, it is decided in step 722, as a function of occupancy information OCC_ADCH and as a function of scheduling request message BSR4, which sidelink resources on sidelink channel SC1 of network unit UE1 are assigned for transmitting data DY ascertained in a step 724. As a result, occupancy information OCC_ADCH from the ad hoc wireless communication network is used in the cell-based wireless communication network to make a scheduling decision. Corresponding scheduling grant message G4 is transmitted to network unit UE1 in a step 726. Network unit UE1 transmits ascertained data DY to network unit UE2 in a step 728. Locally ascertained occupancy information OCC_ADCH is thus advantageously supplied to network unit BS to improve the scheduling decision by network unit BS, taking into account the local occupancy of the unlicensed frequency range.

In one specific embodiment, it is ascertained in step 722, as a function of occupancy information OCC_ADCH, that sidelink channel SC1 is too heavily occupied, whereby sidelink resources for sidelink channel SC2 are reserved in the licensed frequency range in step 722, and these reserved sidelink resources are signaled to network unit UE1 with the aid of scheduling grant message G4. In step 728, data DY is then transmitted on sidelink channel SC2 in a form which is not illustrated.

Additional aspects of this present invention are described in the following paragraphs:

(Paragraph 1) A first roadside network unit, including: a first transceiver for a first wireless communication network, which is designed to receive data from a second roadside network unit on a first channel of the first wireless communication network; a processor, which is designed to provide the received data to a second transceiver for transmission to a third roadside network unit; and the second transceiver for a second wireless communication network, which is designed to transmit the data provided by the processor to the third roadside network unit on a second channel of the second communication network.

(Paragraph 2) The roadside network unit according to Paragraph 1, the processor being designed to ascertain whether the data received from the first transceiver relates to a traffic safety or a traffic efficiency, and to provide the data to the second transceiver only if the data relates to the traffic safety or the traffic efficiency.

(Paragraph 3) The roadside network unit according to Paragraph 1 or 2, the processor and/or the first transceiver being designed to ascertain a piece of local occupancy information in the first wireless communication network, and the processor being designed to provide the local occupancy information to the second transceiver for transmission to a network infrastructure-side network unit; and the second transceiver being designed to transmit the occupancy information to the network infrastructure-side network unit on an uplink channel.

(Paragraph 4) The roadside network unit according to one of the preceding paragraphs, the processor being designed to ascertain data itself, to ascertain whether the self-ascertained data relates to the traffic safety or traffic efficiency, to provide the self-ascertained data to the first transceiver if the self-ascertained data relates to the traffic safety or the traffic efficiency and to provide the self-ascertained data to the second transceiver if the self-ascertained data relates to the traffic safety or the traffic efficiency; the first transceiver being designed to transmit the self-ascertained data on the first channel of the first wireless communication network; and the second transceiver being designed to transmit the self-ascertained data on the second channel of the second wireless communication network.

(Paragraph 5) The roadside network unit according to one of the preceding paragraphs, the received data and/or the self-ascertained data being part of a decentralized environmental notification message, DENM, according to ETSI EN 302 637-3.

(Paragraph 6) The roadside network unit according to one of the preceding paragraphs, the received data and/or the self-ascertained data being part of a cooperative awareness message, CAM, according to ETSI EN 302 637-2.

(Paragraph 7) The roadside network unit according to one of the preceding paragraphs, the first and second channels being transmitted in the same unlicensed frequency range.

(Paragraph 8) The roadside network unit according to Paragraph 7, the first channel being an ad hoc channel, the first wireless communication network being an ad hoc wireless communication network, the second channel being a sidelink channel, and the second wireless communication network being a cell-based wireless network.

(Paragraph 9) The roadside network unit according to Paragraph 7, the second channel being an ad hoc channel, the second wireless communication network being an ad hoc wireless communication network, the first channel being a sidelink channel, and the first wireless communication network being a cell-based wireless network.

(Paragraph 10) The roadside network unit according to one of Paragraphs 1 through 6, the first channel being transmitted in an unlicensed frequency range, and the second channel being transmitted in a licensed frequency range.

(Paragraph 11) The roadside network unit according to Paragraph 10, the first channel being an ad hoc channel, the first wireless communication network being an ad hoc wireless communication network, the second channel being a sidelink channel, and the second wireless communication network being a cell-based wireless network.

(Paragraph 12) A motor vehicle, including the roadside network unit according to one of the preceding paragraphs.

(Paragraph 13) A method for operating a first roadside network unit, the method including: receiving data from a second roadside network unit on a first channel of a first wireless communication network; providing the received data for a transmission to a third roadside network unit; transmitting the provided data to a third roadside network unit on a second channel of a second communication network.

(Paragraph 14) The method according to Paragraph 13, which is designed for execution on a network unit according to one of Paragraphs 1 through 11.

What is claimed is:

1. A first roadside network unit, comprising:
    a first transceiver for a first wireless communication network, the first transceiver being situated in the first roadside network unit and being configured to receive data from a second roadside network unit on a first channel of the first wireless communication network;
    a processor situated in the first roadside network unit and being configured to provide the data received from the second roadside network unit to a second transceiver situated in the first roadside network unit for a transmission to a third roadside network unit; and
    the second transceiver for a second wireless communication network, the second transceiver configured to transmit the data received from the second roadside network unit and provided by the processor, to the third roadside network unit on a second channel of the second communication network;
    wherein the processor is configured to ascertain whether the data received from the second roadside network unit relates to a traffic safety or a traffic efficiency, and wherein the data received from the second roadside network unit are provided to the second transceiver by the processor for transmission to the third roadside network unit only if the processor ascertains that the data received from the second roadside network unit relates to the traffic safety or traffic efficiency;
    wherein the processor is configured to ascertain whether the data received from the second roadside network unit relates to the traffic safety or the traffic efficiency based on a message type of the data received from the second roadside network unit, and wherein the processor is configured to ascertain that the data received from the second roadside network unit relates to the traffic safety or traffic efficiency when the message type is a CAM (cooperative awareness message according to ETSI EN 302 637-2) type or when the message type is a DENM (decentralized environmental notification message according to ETSI EN 302 637-3) type.

2. The first roadside network unit as recited in claim 1, wherein:
    the processor and/or the first transceiver are configured to ascertain a piece of local occupancy information in the first wireless communication network;
    the processor is configured to provide the local occupancy information to the second transceiver for transmission to a network infrastructure-side network unit; and
    the second transceiver is configured to transmit the occupancy information to the network infrastructure-side network unit on an uplink channel.

3. The first roadside network unit as recited in claim 1, wherein:
    the processor is configured to ascertain data itself, ascertain whether the self-ascertained data relate to the traffic safety or the traffic efficiency, provide the self-ascertained data to the first transceiver if the self-ascertained data relate to the traffic safety or the traffic efficiency, and provide the self-ascertained data to the second transceiver if the self-ascertained data relate to the traffic safety or the traffic efficiency;
    the first transceiver is configured to transmit the self-ascertained data on the first channel of the first wireless communication network; and
    the second transceiver is configured to transmit the self-ascertained data on the second channel of the second wireless communication network.

4. The first roadside network unit as recited in claim 1, wherein the received data are part of a decentralized environmental notification message according to ETSI EN 302 637-3.

5. The first roadside network unit as recited in claim 3, wherein the self-ascertained data are part of a decentralized environmental notification message according to ETSI EN 302 637-3.

6. The first roadside network unit as recited in claim 1, wherein the received data are part of a cooperative awareness message according to ETSI EN 302 637-2.

7. The first roadside network unit as recited in claim 3, wherein the self-ascertained data are part of a cooperative awareness message according to ETSI EN 302 637-2.

8. The first roadside network unit as recited in claim 1, wherein the first channel and second channels are transmitted in the same unlicensed frequency range.

9. A first roadside network unit, comprising:
    a first transceiver for a first wireless communication network, the first transceiver being situated in the first roadside network unit and being configured to receive data from a second roadside network unit on a first channel of the first wireless communication network;
    a processor situated in the first roadside network unit and being configured to provide the data received from the second roadside network unit to a second transceiver situated in the first roadside network unit for a transmission to a third roadside network unit; and
    the second transceiver for a second wireless communication network, the second transceiver configured to transmit the data received from the second roadside network unit and provided by the processor, to the third roadside network unit on a second channel of the second communication network;

wherein the first channel and second channels are transmitted in the same unlicensed frequency range;

wherein the first channel is an ad hoc channel, the first wireless communication network is an ad hoc wireless communication network, the second channel is a sidelink channel, and the second wireless communication network is a cell-based wireless network;

wherein the first roadside network unit is a roadside infrastructure, the roadside infrastructure being a road sign or a traffic light or a road barrier or a gate;

wherein the processor is configured to ascertain whether the data received from the second roadside network unit relates to a traffic safety or a traffic efficiency, and wherein the data received from the second roadside network unit are provided to the second transceiver by the processor for transmission to the third roadside network unit only if the processor ascertains that the data received from the second roadside network unit relates to the traffic safety or traffic efficiency; and wherein the processor is configured to ascertain whether the data received from the second roadside network unit relates to the traffic safety or the traffic efficiency based on a message type of the data received from the second roadside network unit, and wherein the processor is configured to ascertain that the data received from the second roadside network unit relates to the traffic safety or traffic efficiency when the message type is a CAM (cooperative awareness message according to ETSI EN 302 637-2) type or when the message type is a DENM (decentralized environmental notification message according to ETSI EN 302 637-3) type.

10. The first roadside network unit as recited in claim 8, wherein the second channel is an ad hoc channel, the second wireless communication network is an ad hoc wireless communication network, the first channel is a sidelink channel, and the first communication network is a cell-based wireless network.

11. The first roadside network unit as recited in claim 1, wherein the first channel is transmitted in an unlicensed frequency range, and the second channel is transmitted in a licensed frequency range.

12. A first roadside network unit, comprising:
a first transceiver for a first wireless communication network, the first transceiver being situated in the first roadside network unit and being configured to receive data from a second roadside network unit on a first channel of the first wireless communication network;
a processor situated in the first roadside network unit and being configured to provide the data received from the second roadside network unit, to a second transceiver situated in the first roadside network unit for a transmission to a third roadside network unit; and
the second transceiver for a second wireless communication network, the second transceiver configured to transmit the data received from the second roadside network unit and provided by the processor, to the third roadside network unit on a second channel of the second communication network;
wherein the first channel is transmitted in an unlicensed frequency range, and the second channel is transmitted in a licensed frequency range;
wherein the first channel is an ad hoc channel, the first wireless communication network is an ad hoc wireless communication network, the second channel is a sidelink channel, and the second wireless communication network is a cell-based wireless network;
wherein the first roadside network unit is a roadside infrastructure, the roadside infrastructure being a road sign or a traffic light or a road barrier or a gate;
wherein the processor is configured to ascertain whether the data received from the second roadside network unit relates to a traffic safety or a traffic efficiency, and wherein the data received from the second roadside network unit are provided to the second transceiver by the processor for transmission to the third roadside network unit only if the processor ascertains that the data received from the second roadside network unit relates to the traffic safety or traffic efficiency; and
wherein the processor is configured to ascertain whether the data received from the second roadside network unit relates to the traffic safety or the traffic efficiency based on a message type of the data received from the second roadside network unit, and wherein the processor is configured to ascertain that the data received from the second roadside network unit relates to the traffic safety or traffic efficiency when the message type is a CAM (cooperative awareness message according to ETSI EN 302 637-2) type or when the message type is a DENM (decentralized environmental notification message according to ETSI EN 302 637-3) type.

13. A motor vehicle, including a first roadside network unit, the first roadside network unit comprising:
a first transceiver for a first wireless communication network, the first transceiver being situated in the first roadside network unit and being configured to receive data from a second roadside network unit on a first channel of the first wireless communication network;
a processor situated in the first roadside network unit and configured to provide the data received from the second roadside network unit to a second transceiver situated in the first roadside network unit for a transmission to a third roadside network unit; and
the second transceiver for a second wireless communication network, the second transceiver configured to transmit the data received from the second roadside network unit provided by the processor, to the third roadside network unit on a second channel of the second communication network;
wherein the first channel is an ad hoc channel, the first wireless communication network is an ad hoc wireless communication network, the second channel is a sidelink channel, and the second wireless communication network is a cell-based wireless network;
wherein the processor is configured to ascertain whether the data received from the second roadside network unit relates to a traffic safety or a traffic efficiency, and wherein the data received from the second roadside network unit are provided to the second transceiver by the processor for transmission to the third roadside network unit only if the processor ascertains that the data received from the second roadside network unit relates to the traffic safety or traffic efficiency; and
wherein the processor is configured to ascertain whether the data received from the second roadside network unit relates to the traffic safety or the traffic efficiency based on a message type of the data received from the second roadside network unit, and wherein the processor is configured to ascertain that the data received from the second roadside network unit relates to the traffic safety or traffic efficiency when the message type is a CAM (cooperative awareness message according to ETSI EN 302 637-2) type or when the message type is a DENM (decentralized environmental notification message according to ETSI EN 302 637-3) type.

14. A method for operating a first roadside network unit, the method comprising the following steps:
    receiving, by the first roadside network unit, data from a second roadside network unit on a first channel of a first wireless communication network;
    providing the data received from the second roadside network, for transmission to a third roadside network unit;
    transmitting, by the first roadside network unit, the provided data to a third roadside network unit on a second channel of a second communication network;
    wherein the first channel is an ad hoc channel, the first wireless communication network is an ad hoc wireless communication network, the second channel is a sidelink channel, and the second wireless communication network is a cell-based wireless network;
    wherein the first roadside network unit is a roadside infrastructure, the roadside infrastructure being a road sign or a traffic light or a road barrier or a gate; wherein the method is executed by a first roadside network unit which includes a first transceiver for a first wireless communication network, the first transceiver configured to receive the data from the second roadside network unit on the first channel of the first wireless communication network, a processor configured to provide the data received from the second roadside network unit to a second transceiver for a transmission to the third roadside network unit, and the second transceiver for the second wireless communication network, the second transceiver configured to transmit the data received from the second roadside network unit provided by the processor, to the third roadside network unit on the second channel of the second communication network, wherein the processor is configured to ascertain whether the data received from the second roadside network unit relates to a traffic safety or a traffic efficiency, and wherein the data are provided to the second transceiver by the processor for transmission to the third roadside network unit only if the processor ascertains that the data received from the second roadside network unit relate to the traffic safety or traffic efficiency;
    wherein the processor is configured to ascertain whether the data received from the second roadside network unit relates to the traffic safety or the traffic efficiency based on a message type of the data received from the second roadside network unit, and wherein the processor is configured to ascertain that the data received from the second roadside network unit relates to the traffic safety or traffic efficiency when the message type is a CAM (cooperative awareness message according to ETSI EN 302 637-2) type or when the message type is a DENM (decentralized environmental notification message according to ETSI EN 302 637-3) type.

15. The first roadside network unit as recited in claim 1, wherein the first channel is an ad hoc channel, the first wireless communication network is an ad hoc wireless communication network, the second channel is a sidelink channel, and the second wireless communication network is a cell-based wireless network.

16. The first roadside network unit as recited in claim 1, wherein the first roadside network unit is a roadside infrastructure, the roadside infrastructure being a road sign or a traffic light or a road barrier or a gate.

* * * * *